Aug. 31, 1965

A. J. VAN NOORD 3,203,060

SEAT BELT BUCKLE

Filed Jan. 21, 1963

INVENTOR.
Andrew J. Van Noord
BY
Dale A. Winnie
ATTORNEY

Aug. 31, 1965   A. J. VAN NOORD   3,203,060
SEAT BELT BUCKLE
Filed Jan. 21, 1963   2 Sheets-Sheet 2
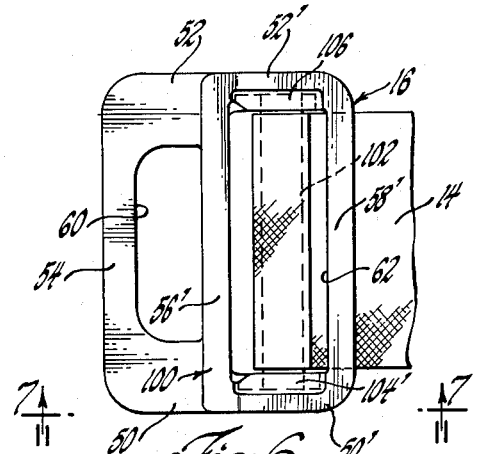
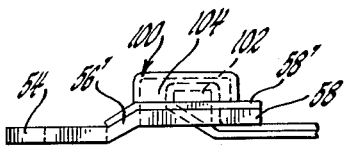
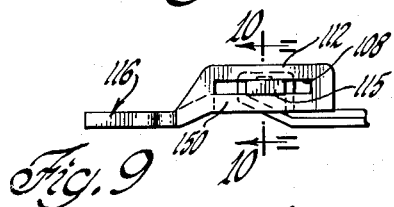
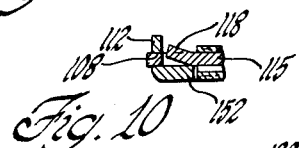
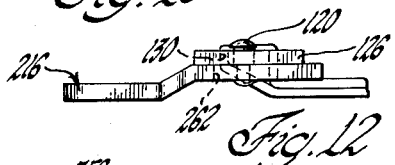
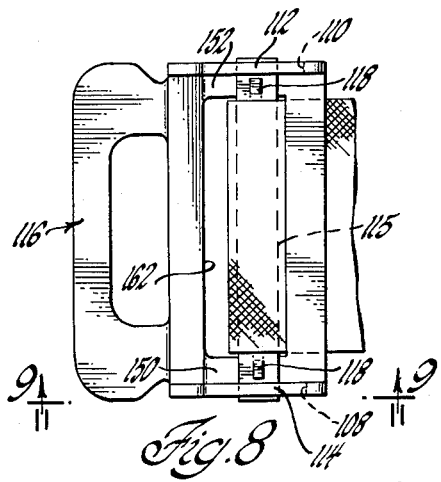
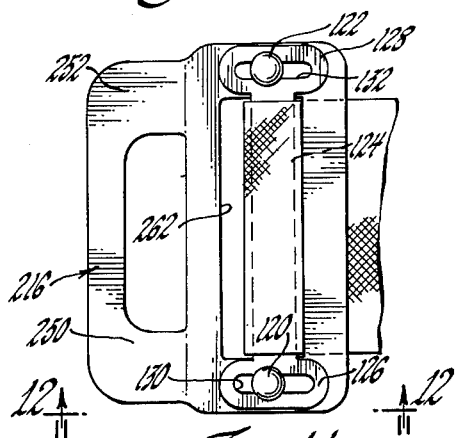
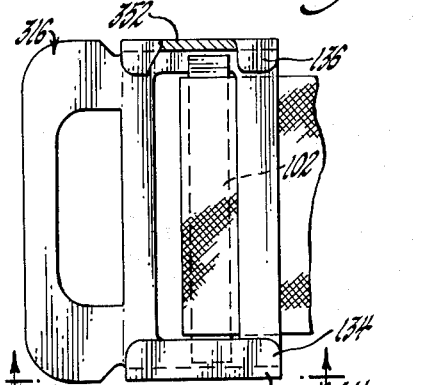
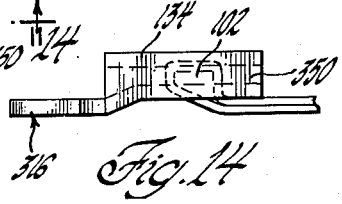
INVENTOR.
Andrew J. Van Noord
BY
Dale A. Winnie
ATTORNEY

United States Patent Office 3,203,060
Patented Aug. 31, 1965

3,203,060
SEAT BELT BUCKLE
Andrew J. Van Noord, Grand Rapids, Mich., assignor to Kent Engineering Consultants, Grand Rapids, Mich., a partnership
Filed Jan. 21, 1963, Ser. No. 252,716
6 Claims. (Cl. 24—77)

This invention relates to safety belts in general and more particularly to safety seat belts for automotive and like uses.

Safety seat belts are principally known as used on aircraft, sports cars and other exceptionally fast moving vehicles. However, there is an increasing trend towards using such seat belts on ordinary automotive vehicles and much consideration is being given to the changes necessary to assure their use and suitability for such purpose.

Most seat belts in present use are of the type used on commercial aircraft. The belt webbing is coarse and heavy, the seat buckle is massive and the buckle operation is unnatural and clumsy. Generally speaking, the structure is unattractive, uncomfortable and in many instances unmanageable without some assistance.

Aircraft type seat belts are principally retaining rather than restraining devices. They are normally fastened to the seat structure and are movable therewith. Their principal use is in keeping passengers in their seats during take-offs, landings and rough flying weather. Accordingly, they are not normally in continuous use and the passenger is not aware of the inconvenience or discomfort that their weight or bulk would cause in the constant use required for automotive safety purposes.

In automotive use a seat belt must be simple and inexpensive to install, of sufficient simplicity in operation to be used by children without assistance, light in weight and small in size to minimize the discomfort incident to the continuous use required, readily adjustable for added comfort, and, in view of the floor mounting whereby seat adjustment affects the belt tension, must provide for unfailing quick release following an accident, and be simple in construction and assembly to minimize costs and assure a retail price attractive to auto owners. In the absence of these minimum standards seat belts will not be purchased or will not be used even if supplied as original automotive equipment.

It is an object of this invention to provide a seat belt buckle particularly suited for use with automotive type safety seat belts and which affords all of the advantages last mentioned.

It is an object of this invention to provide a seat belt buckle which is simple in construction and accordingly economical in cost.

It is also an object of this invention to provide a seat belt buckle which includes a minimum of parts for ease in assembly and still greater cost reduction.

Another object of this invention, in this same regard, is to provide a seat belt buckle of stamped rather than die cast construction and formed from simple stampings.

It is an object of this invention to provide a seat belt buckle having a latching member of simple stamped construction which is cooperatively formed for locking engagement with a belt tongue of equally simple stamped construction and wherein the transfer of stress forces is provided therebetween rather than through the housing member.

It is an object of this invention to provide a buckle housing, latch and tongue cooperatively formed and assembled to obtain a compact, lightweight and small but highly effective belt retaining assembly.

It is an object of this invention to provide a seat belt buckle including cooperative means for belt and engagement with the keeper and tongue members and which affords adjustment of the belt with at least one thereof.

It is a more specific object of this invention to provide a seat belt buckle wherein belt adjustment may be obtained by simple means provided at the tongue engaged belt end.

A further object of this invention is to provide a seat belt buckle assuring maximum holding power by a distribution of forces in a common plane therethrough with only light spring pressure required to be overcome for quick release.

These and other objects and advantages to be gained in the practice of this invention will be more apparent upon a reading of the following specification having reference to a preferred embodiment of this invention and with particular attention directed to the accompanying drawings wherein:

FIGURE 6 is a top plan view of a modified form of tongue member and adjustment bar arrangement.

FIGURE 7 is a side view of the tongue and adjustment bar arrangement shown by FIGURE 6 as seen in the plane of line 7—7.

FIGURES 8 and 9 are respectively top plan and side views of another form of tongue and adjustment bar arrangement.

FIGURE 10 is a cross-sectional detail feature of the adjustment bar arrangement shown by FIGURE 9 and as seen in the plane of line 10—10 thereon.

FIGURES 11 and 12 are respectively plan and side views of still another form of tongue and adjustment bar arrangement.

FIGURES 13 and 14 are respectively top plan and side views of a further modified form of tongue and adjustment bar arrangement.

Figure 1:
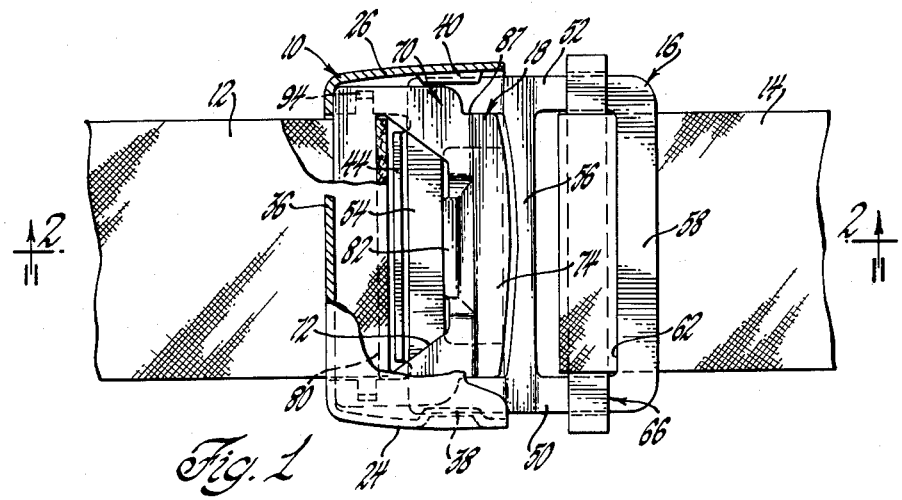
FIGURE 1 is a top plan view of a seat belt buckle embodying the principles of this invention with a part of the housing broken away to better illustrate the functional parts thereof.

Referring to the drawings in further detail:

Although not shown, it will be appreciated that a seat belt includes two separate belt parts secured to a suitable floor mounting on opposite sides of a seat and having the free ends thereof engaged together by some form of belt buckle.

In the present instance, a belt buckle 10 is shown with a seat belt part 12 received in one end thereof and secured thereto in a manner later described. The other seat belt part 14 is engaged to a tongue member 16 which is in turn received within the other end of the buckle where it is engaged and retained by a keeper member 18.

The seat belt buckle 10 includes a housing part 20 which is formed from a sheet metal stamping. It includes a top side or wall 22, side walls 24 and 26 and a bottom wall 28 formed by abutting the stamping ends 30 and 32 together. The housing is essentially open at opposite ends and is accordingly receptive of the seat belt part 12 and tongue member 16 therein as previously mentioned.

The top wall 22 of the housing is inclined slightly downward from the front to back edge thereof. It also has a part of the front edge cut away, as at 34, and the back edge rolled downward to form an apertured back wall 36.

The enclosing side walls 24 and 26 of the housing are formed to include inwardly pressed shoulder forming members 38 and 40. These are provided near the front of the housing and are spaced from the bottom wall 28 to serve as guides for the tongue member 16 when it is received in the housing.

The bottom wall 28 of the housing part includes an access 42 at the back end thereof which is formed in part by bending up the rearwardly disposed sides of the stamping ends 30 and 32 to extend into the housing. This also serves to form a shoulder wall 44 behind which a part of the keeper 18 is retained and in front of which the tongue member 16 is properly postioned for engagement by the keeper.

The access opening 42 in the bottom wall of the housing mates with an opening 46 formed in the back housing wall 36 and both are receptive of the webbing of the safety belt part 12 therethrough. The other end of the housing includes the opening 48 through which the tongue member 16 is received.

Figure 2:
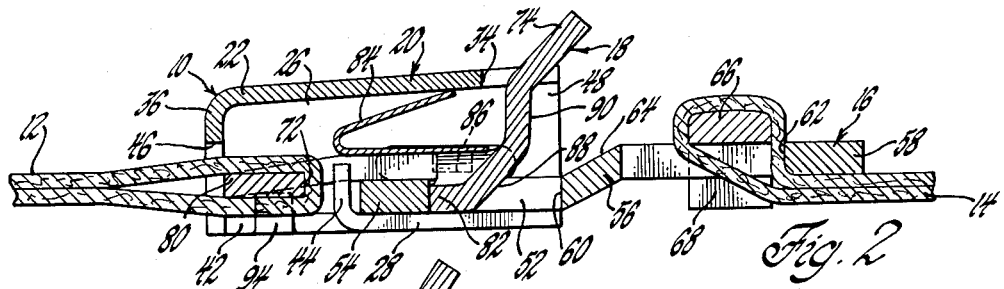
FIGURE 2 is a cross-sectional view of the seat belt buckle of FIGURE 1 taken in the plane of line 2—2 thereon.
Figure 3:
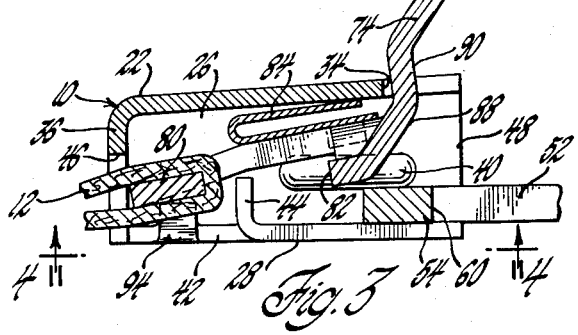
FIGURE 3 is similar to FIGURE 2 with the keeper member of the structure shown in a different position and the tongue member partially retracted.
Figure 4:
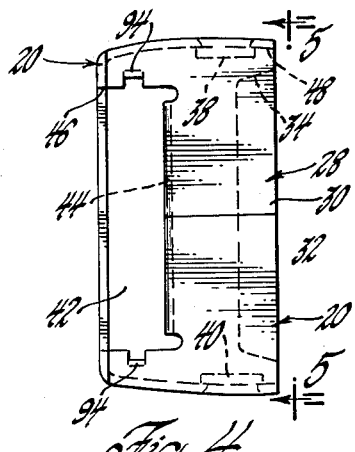
FIGURE 4 is a bottom plan view of the housing part of the seat belt buckle structure.
Figure 5:
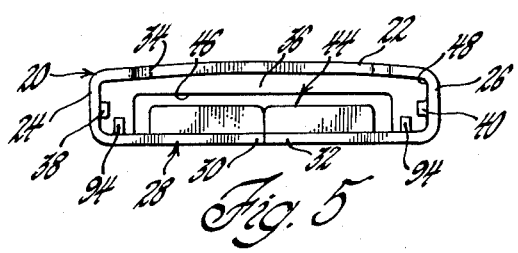
FIGURE 5 is an end view of the seat belt buckle housing as seen in the plane of line 5—5 of FIGURE 4.

Referring now to the tongue member 16 shown by FIGURES 1–3, it is formed from a simple stamping and includes side rails 50 and 52 with spaced cross rails 54, 56 and 58 disposed to form two separate and distinct loops which provide openings 60 and 62. The side rails 50 and 52 are each formed to include a step 64 at the center cross rail 56 and this disposes the different ends of the tongue member in relatively different parallel planes of reference.

An adjustment bar 66 is provided on the rearwardly disposed end of the tongue member 16 and it is adapted to have the seat belt part 14 engaged thereto. The adjustment bar 66 is formed to extend across the tongue member 16, over the opening 62, and includes downwardly turned and inbent ends 68.

By threading the seat belt part 14 through the opening 62, from the underside, over the far side of the adjustment bar 66 and back through the opening 62, on the near side and so the tag end is disposed immediately next adjacent the cross rail 58, the adjustment bar is retained on the tongue 16 and is movable between the ends of the opening 62 as restrained by the belt webbing. The adjustment bar 66 is movable away from the cross rail 58 in taking up slack in the belt 14 and holds the belt wedged thereagainst when the belt is under tension as when the tongue member 16 is engaged in the buckle 10.

It will be noted that the belt part 14 received for engagement with the tongue member 16 is in the same general plane of reference as the tongue end which is received for engagement in the buckle 10.

The keeper member 18 is a stamping and includes a rearwardly and downwardly inclined part 70, having an opening 72 provided therein, and an upstanding finger grip flange 74.

Referring to FIGURE 2, the side rails of the keeper about the opening 72 are sloped downwardly near their extended ends and are joined by a cross rail 80. The cross rail 80 is adapted to have the seat belt part 12 looped thereover and has the belt receptive center portion of the rail twisted back to a generally horizontal plane of reference.

The shoulder wall 44, which is formed from the bottom wall of the housing 20, extends into the opening 72. The belt receptive cross rail 80 is disposed behind such shoulder wall 44 with but little more than clearance for the belt webbing to be extended therebetween.

The end of the keeper 18 at the cross rail 80 is shaped to the general contour of the housing 20 and extends across the access opening 42 in the bottom wall. It is afforded sufficient bearing surface to preclude any twisting by having its side edges supported on the bottom wall and against the sides of the back wall 36.

Although the drawings show the inner disposed end of the keeper 18 held somewhat off from the bottom wall of the housing, this is a refinement that will be described later and should be disregarded for the present.

The keper member 18 is further formed to include a depressed latch shoulder 82 which extends from the finger grip flange 74 into the opening 72. The latch shoulder 82 is stepped below the side rails of the keeper sufficiently to receive the cross rail 54 of the tongue member 16 under the keeper side rails and to fully engage the inner edge thereof.

The keeper 18 is biased for engagement of the latch shoulder 82 on the bottom wall of the housing 20 by a flat leaf spring 84 which is bent double. The spring 84 extends across the keeper and is in compression as disposed between the keeper and the upper housing wall 22. It is retained against longitudinal or lateral movement by depending tabs 86 which are engaged in shoulder recesses 87 formed in the keeper 18 on opposite sides of the finger grip flange 74.

The leaf spring 84 serves to hold the keeper 18 in a rattle-free disposition in the buckle housing 10 when the tongue 16 is not engaged therewith. By holding the keeper down over the shoulder wall 44 it also serves to keep the keeper in the housing by holding the cross rail 80 behind the shoulder wall. Although the spring yields readily to permit the tongue 16 to be received and engaged under the keeper, or to be released therefrom, it does not permit the keeper to be unintentionally lifted over the shoulder wall.

The finger grip flange 74 of the keeper includes a cam surfaced underside 88 whereby the tongue member 16 can lift the keeper and pass under for engagement therewith. It also includes a generally vertically disposed part 90 which helps to close the opening 48 in the end of the housing. The terminal end of the keeper extends through the cut-away 34 in the top wall 22 of the housing and is the part which actually serves as the finger grip portion 74.

It will be noted that in the release position of the keeper 18, as shown by FIGURE 3, the flange wall 90 also serves as a stop to preclude undue elevation of the latching end of the keeper by engagement with the undercut edge of the top wall 22. This also serves to keep the cross rail 80 of the keeper from being inadvertently elevated to a position where it might pass over the retaining shoulder wall 44.

At this point it should be noted that the keeper cross rail 80 is not shown by the drawings as seated on the bottom wall of the housing 20. It is actually shown as resting on a pair of inbent tabs 94 struck from the housing bottom wall.

This innovation serves a decided purpose.

The latch shoulder 82 must be disposed sufficiently below the keeper side rails at the tongue receptive end of the keeper to assure good and secure latching engagement. At the same time the side rails must be bent downwardly to dispose the keeper cross rail 80 in a position to receive the seat belt part 12 and the cross rail must be bent back to lie behind the shoulder wall 44.

The greater the bending required the greater should be the cross-section of the part where the bending is to occur. Thus, if minimum bending is required a smaller, less expensive and lighter weight piece is useable.

Accordingly, a saving is obtained in having the keeper cross rail 80 disposed at a slightly higher elevation than the latch shoulder 82. The tabs 94 serve to hold the cross rail 80 up and the latch shoulder 82 properly disposed. The keeper pivots on the tabs 94 back from the front edge, rather than at the front edge, of the cross rail 80 and accordingly moves very little relative to the shoulder wall 44 though disposed relatively higher in relation thereto.

The intermediate disposition of the keeper cross rail 80 is a compromise between a straight ended keeper and one bent to seat on the housing bottom wall which obtains the advantages aforementioned and still has the belt stress applied substantially in the plane of the latching shoulder clear through the seat belt buckle.

The seat belt buckle 10 is assembled and used in the following manner.

The seat belt webbing 12 is looped around the cross rail 80 of the keeper 18 and the tag end is secured as by sewing to the longer end thereof. The loose end of the seat belt 12 is then inserted clear through the housing and the keeper is pulled into the housing and into a seated position. Thereafter, the leaf spring 84 is compressed and inserted into the housing 20 between the top of the keeper and the upper wall 22. It is pushed into the housing until its tab ends 86 snap into retaining engagement behind the finger grip flange 74.

The other seat belt part 14 is engaged to the adjustment bar 66 on the tongue member 16 as previously described.

The tongue 16 is inserted in the housing 20 through opening 48 and is guided under the shoulders 38 and 40. The tongue 16 may be pressed against the underside of the keeper to lift it up and pass thereunder, or the keeper may be raised by means of the flange 74.

The spring 84 is compressed further as the tongue 16 passes under the keeper 18 and the latter pivots on its inner disposed end. The spring then snaps the latch shoulder 82 into holding engagement behind the tongue cross rail 54 and the attachment is completed.

Any slack in the seat belt is taken up by pulling on the tag end of the webbing 14. This causes the adjustment bar 66 to back off from its wedge-locking position and to allow the webbing to pass thereover.

The belt is loosened by either manually moving the adjustment bar 66 towards the housing 20 to release the webbing and allow the belt to be lengthened, or by tilting the tongue receptive end of the buckle housing 20, with the tongue engaged therein, upward approximately 90° to relieve the belt pressure on the adjustment bar 66, which holds it in the wedge-locking position, and thereby allow the belt to be lengthened by passing thereover.

The seat belt buckle 10 is disengaged from the tongue member 16 by reaching across the housing 20, engaging the fingers with the keeper flange 74, and pulling back in a perfectly natural movement. This lifts the latch shoulder 82 out of engagement with the tongue 16 and allows its release.

The disclosed seat belt assembly includes a minimum of parts all of which may be formed from stampings and plated as required. No forming is necessary after plating, as is usually necessary, to provide means for retaining the parts assembled. The assembly is simple and the operation is both simple and effective. The housing is not required to serve as a stress transfer part but only to shield and protect the keeper and tongue members which are directly connected and each have an end of the seat belt engaged thereto.

It should be noted that the seat belt buckle 10 is both shorter and thinner than most known seat belt buckles. This is due to the compact arrangement of parts and to having the seat belt adjustment provided on the tongue member 16 rather than inside the seat belt buckle housing.

FIGURES 6–14 show variations of the seat belt adjustment feature previously described.

In FIGURES 6 and 7 the tongue member 16 is formed as previously mentioned, like parts being similarly identified, and a retaining device 100 is affixed to the rearwardly disposed end to receive and retain the adjustment bar 102. The retaining device is formed from a stamping to include like cross rails, identified 56' and 58', side rail parts 50' and 52', and elongated end caps 104 and 106 from such side rail parts. The adjustment bar 102 extends across the tongue opening 62 as before and, in this instance, has its ends received within the end caps 104 and 106. The bar receives the seat belt part 14 as before and operates in essentially the same manner.

FIGURES 8–10 show another adjustment bar variation. In this instance the tongue member 116 has the side rail parts 150 and 152 on opposite sides of the tongue opening 162 formed wider in the stamping and provided with elongated slots 108 and 110 which, when turned up as shown, provide guide rails 112 and 114 for the adjustment bar 115. The adjustment bar extends through the guide slots 108 and 110 and has a shoulder 118 struck near each end thereof to prevent endwise movement of the bar.

FIGURES 11 and 12 show a tongue member 216 with wider side rail parts 250 and 252 adjacent the opening 262. In this variation guide pins 120 and 122 are provided through the side rail parts and the adjustment bar 124 is formed to include wider ends 126 and 128 with guide slots 130 and 132. The adjustment bar 124 is thereby movable on the tongue 216 within the limits afforded by the pins in the guide slots and functions essentially as previously described.

FIGURES 13 and 14 merely show that a tongue member 316 may be provided by having extended side rail parts 350 and 352 formed up and bent in to provide guide rails 134 and 136 within which an adjustment bar 102, similar to that in the variation of FIGURES 6 and 7, is useable.

One of the principal advantages to be obtained in using one of the adjustment bar variations of FIGURES 6–14 is that the underside of the belt retaining tongue member includes no movable part which might inadvertently catch on clothing as, in rare instances and through carelessness, could happen with the wrapped ends of the adjustment bar 66 shown in FIGURES 1–3.

I claim:
1. A seat belt buckle assembly, comprising:
   (a) a housing member open at opposite ends,
   (b) a keeper member having an end received and retained within said housing member,
   (c) a seat belt tongue member receivable in one end of said housing and engageable with said keeper member,
   (d) said keeper member being formed to include
       (1) an opening in the housing received end thereof
       (2) providing a cross rail at one end of said opening receptive of seat belt webbing in engagement therewith,
       (3) and a depending latch shoulder at the other end thereof,
   (e) and said tongue member including a cross rail receivable under said keeper member and for engagement with said latch shoulder.
2. The seat belt buckle assembly of claim 1:
   (f) said keeper member having the cross rail thereof and said latch shoulder disposed in coplanar relation.
3. The seat belt buckle assembly of claim 1:
   (f) said housing having an inbent shoulder wall formed from the bottom wall thereof and received within said keeper opening,
   (g) said shoulder wall being disposed to receive said keeper cross rail therebehind and for stop positioning of said tongue member for latch shoulder engagement.
4. The seat belt assembly of claim 1 including:
   (f) a leaf spring member received within said housing between said keeper member and the top wall of said housing for biasing said keeper and the latch shoulder thereof for tongue retaining engagement,
   (g) and said leaf spring having tab means formed therefrom and disposed for retaining external shoulder engagement with said keeper member.
5. The seat belt assembly of claim 1:
   (f) said tongue member having an elevational step provided in the seat belt engaged end thereof and an opening formed therethrough,
   (g) and a belt receptive bar received on said elevational step across said opening and guided on the sides of said tongue member for receiving said seat belt through said opening and looped therearound with the ends of said seat belt in the plane of the engaged end of said tongue member.

6. A seat belt device, comprising:
(a) a cover housing having a keeper member disposed therein and receptive of a tongue member in stress transferring engagement therewith,
(b) said cover housing being formed to include top, side and bottom walls, and having one end open and an end wall with a smaller opening extended across the other end thereof,
(c) said keeper member having an opening formed in the inwardly disposed end thereof and a finger-grip flange provided at the other end thereof and accessible through said one open housing end,
(d) a cross rail provided at one end of said keeper opening and a latch shoulder provided at the other end thereof and exposed within said opening,
(e) a shoulder wall struck from the bottom wall of said housing and extending therein,
(f) said shoulder wall being receptive of said keeper cross rail thereover and behind in the assembly of said keeper member in said housing and within said keeper opening for retentive positioning of said keeper member in said housing,
(g) an access opening formed in the bottom wall of said cover housing by said shoulder wall being struck therefrom,
(h) said access opening being in open communication with said smaller housing end opening and receptive of seat belt webbing therethrough for engagement with said keeper cross rail,
(i) fulcrum tabs struck from said housing bottom wall and disposed for fulcrum engagement with said keeper cross rail,
(j) a flat leaf spring bent double and engaged between said housing top wall and said keeper for biasing said keeper towards the bottom wall of said housing,
(k) a seat belt retaining tongue member receivable in said one open housing end and including a cross rail formed and disposed for engagement with the latch shoulder of said keeper member,
(l) said shoulder wall being disposed to provide a positioning stop for said tongue member,
(m) and said tongue member being formed to include an elevational step and having belt retaining means provided thereon with the seat belt webbing received thereby disposed in the plane of latch shoulder engagement with the other end thereof.

References Cited by the Examiner

UNITED STATES PATENTS

| | | | |
|---|---|---|---|
| 398,780 | 2/89 | Hirst | 24—230 |
| 643,431 | 2/00 | Washburne. | |
| 1,701,970 | 2/29 | Chaunard | 24—230 |
| 2,862,268 | 12/58 | Cushman | 24—75 |
| 2,888,724 | 6/59 | Anderson et al. | 24—77 |
| 2,933,795 | 4/60 | Meeker | 24—230 |

WILLIAM FELDMAN, *Primary Examiner.*

DONLEY J. STOCKING, *Examiner.*